United States Patent

Tanahashi et al.

[11] 4,039,293
[45] Aug. 2, 1977

[54] CATALYTIC CONVERTER FOR AN INTERNAL COMBUSTION ENGINE

[75] Inventors: Toshio Tanahashi, Toyota; Hitoshi Hasegawa, Nagoya, both of Japan

[73] Assignee: Toyota Jidosha Kogyo Kabushiki Kaisha, Toyota, Japan

[21] Appl. No.: 703,816

[22] Filed: July 9, 1976

[30] Foreign Application Priority Data

June 15, 1976 Japan .................................. 51-77054

[51] Int. Cl.² .......................... B01J 8/02; F01N 3/15; F01N 3/14
[52] U.S. Cl. .................................. 23/288 F; 23/277 C
[58] Field of Search .......... 23/277 C, 288 F, 288 FA, 23/288 FB, 288 FC

[56] References Cited

U.S. PATENT DOCUMENTS

| | | | |
|---|---|---|---|
| 3,172,251 | 3/1965 | Johnson | 23/288 FB |
| 3,460,916 | 8/1969 | Aronsohn | 23/288 F |
| 3,649,215 | 3/1972 | Perga et al. | 23/288 F |
| 3,690,840 | 9/1972 | Volker | 23/288 F X |
| 3,710,575 | 1/1973 | Lamm | 23/277 C X |
| 3,793,830 | 2/1974 | August | 23/288 F X |
| 3,972,685 | 8/1976 | Hanaoka | 23/288 F X |

*Primary Examiner*—Morris O. Wolk
*Assistant Examiner*—Roger F. Phillips
*Attorney, Agent, or Firm*—Stevens, Davis, Miller & Mosher

[57] ABSTRACT

A catalytic converter for use in an internal combustion engine, comprising an exhaust gas inlet, an exhaust gas outlet and a catalytic layer dividing a chamber formed in the converter casing into an upper chamber connected to the exhaust gas inlet and a lower chamber connected to the exhaust gas outlet. The catalytic layer is arranged so that the thickness of the catalytic layer decreases towards the exhaust gas outlet from the exhaust gas inlet. A restricted opening is formed in the upper chamber on the exhaust gas inlet side.

6 Claims, 7 Drawing Figures

4,039,293

CATALYTIC CONVERTER FOR AN INTERNAL COMBUSTION ENGINE

DESCRIPTION OF THE INVENTION

The present invention relates to a catalytic converter for an internal combustion engine, and particularly relates to a catalytic convertor in which a chamber formed in a casing of the catalytic converter is divided into an upper chamber and a lower chamber by a catalytic layer interposed between an upper chamber and the lower chamber, and an exhaust gas inlet connected to the upper chamber is formed at one end of the converter casing, while an exhaust gas outlet connected to the lower chamber is formed at the other end of the converter casing remote from said one end of the converter casing.

In order to reduce the amount of harmful HC and CO components in exhaust gas, a method has been proposed in which secondary air is fed into the exhaust gas and, then, the exhaust gas is delivered into the catalytic converter, whereby the unburned HC and CO components are oxidized in the catalytic converter. In this conventional method, since a large part of the harmful CO and HC components in the exhaust gas are oxidized in the catalytic layer in the catalytic converter, the temperature of the catalyzer becomes extremely high, which results in the disadvantage that the catalyzer deteriorates rapidly.

In order to eliminate the above-described disadvantage, another method has been proposed in which a manifold reactor is attached to the outlet of the exhaust port formed in the cylinder head of the engine. An oxidation of unburned HC and CO in the exhaust gas having a relatively high temperature is promoted in the manifold reactor due to the heat of the exhaust gas, and then remaining unburned HC and CO is completely purified in the catalytic converter arranged downstream of the manifold reactor. However, in this method, there are disadvantages that it is necessary to provide an expensive manifold reactor and, there is a problem of deterioration through melting of it since the manifold reactor is exposed to the exhaust gas having a relatively high temperature. The reliability of an exhaust gas purifying system according to this method is lowered since the number of parts is increased due to the provision of the manifold reactor.

In addition, a further method has been proposed in which a reactor is disposed in the vicnity and upstream of the inlet of the catalytic converter. However, in this method, since the temperature of the exhaust gas flowing into the catalytic converter is excessive lowered, there is the disadvantage that the oxidation of unburned CO and HC in the exhaust gas can not be sufficiently carried out.

An object of the present invention is to eliminate the above-mentioned disadvantages and to provide a catalytic converter of a novel construction capable of preventing the deterioration of the catalyzer and the melting of the catalytic converter by means of a slight change in the construction of the conventional catalytic converter.

According to the present invention, there is provided a catalytic converter for purifying the unburned HC and CO components in the exhaust gas from an internal combustion engine, comprising: a casing forming therein a chamber and having on its one end an exhaust gas inlet and on its other end an exhaust gas outlet; partition means extending from said exhaust gas inlet to said exhaust gas outlet and dividing said chamber into an upper chamber, a lower chamber and a middle chamber therebetween filled with catalyzer, said upper chamber being only connected to said exhaust gas inlet, while said lower chamber is only connected to said exhaust gas outlet, said catalyzer including an active catalyzer which has a density gradient, said density of the active catalyer decreasing towards said exhaust gas outlet from said exhaust gas inlet, and; an exhaust gas flow restricting means formed in said upper chamber on the exhaust gas inlet side for forming an unburned components burning chamber in said upper chamber downstream of said restricting means.

The above-mentioned object of the present invention will be more fully understood from the following descriptions of preferred embodiments of the invention, together with the accompanying drawings.

Figure 6:
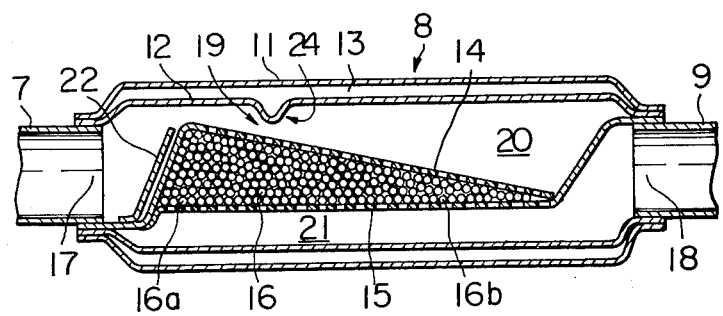
Figure 7:
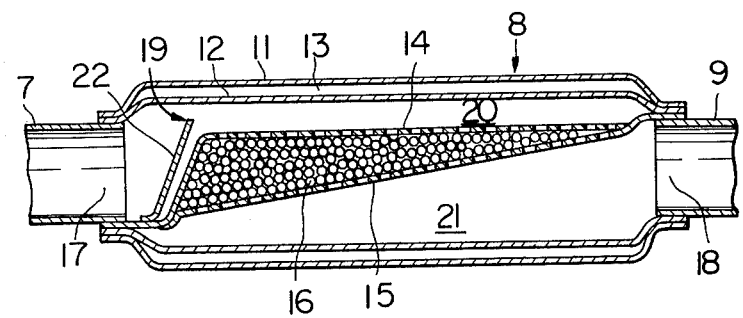

FIG, 5 is a longitudinal cross-sectional view of a still further embodiment;

FIG. 6 is a longitudinal cross-sectional view of a still further embodiment, and;

FIG. 7 is a longitudinal cross-sectional view of a still further embodiment.

DESCRIPTION OF PREFERRED EMBODIMENTS

Figure 1:
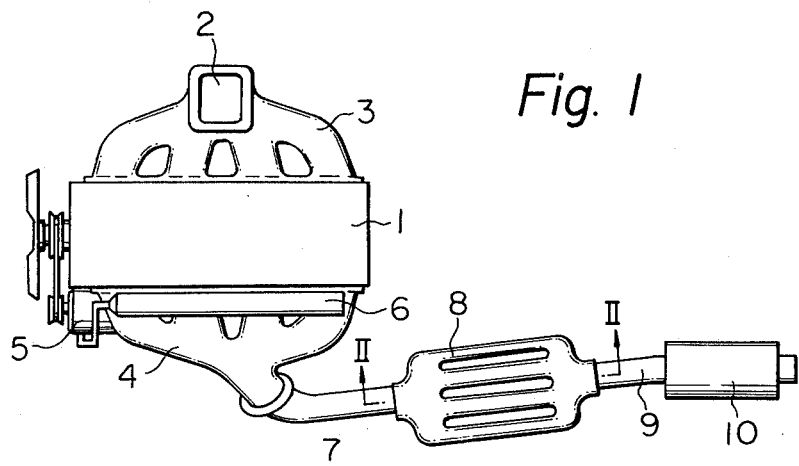
FIG. 1 is a plan view of an internal combustion engine equipped with a catalytic converter according to the present invention.

Referring to FIG. 1, an internal combustion engine comprises: an engine body 1; an intake manifold 3 equipped with a carburetor 2; an exhaust manifold 4; an air pump 5 driven by the engine; an air manifold 6 connected to the delivery side of the air pump 5 for feeding secondary air into the exhaust gas flowing in the branches of the exhaust manifold 4; an exhaust pipe 7 connected to the oulet side of the exhaust manifold 4; a catalytic converter 8 connected to the outlet side of the exhaust pipe 7 according to the present invention; an exhaust pipe 9 connected to the outlet side of the catalytic converter 8, and; a muffler 10.

Figure 2:
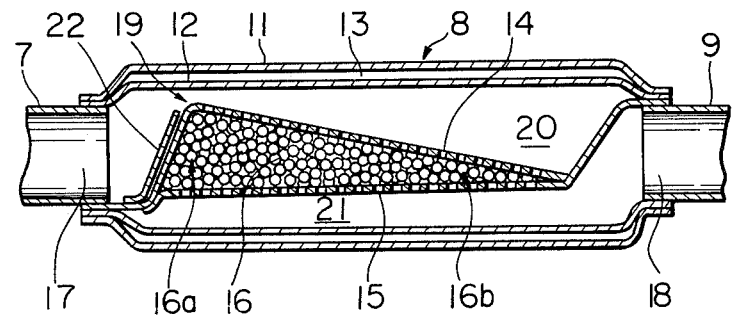
FIG. 2 is a longitudinal cross-sectional view of the catalytic converter taken along the line II—II in FIG. 1.

FIG. 2 shows a longitudinal sectional view of the catalytic converter 8 taken along the line II—II in FIG. 1. Referring to FIG. 2, the catalytic converter 8 comprises an outer casing 11 and an inner casing 12. A gap between the outer casing 11 and the inner casing 12 is filled with heat insulating material. An upper perforated plate 14 and a lower perforated plate 15, each having a flat surface extending in the tranverse direction of the converter 8, are diposed in the inner casing 12. A space between the upper and the lower perforated plates 14 and 15 is filled with a catalytic layer 16 consisting of, for example, a number of alumina granules coated with a catalyzer. The outer and the inner casings 11 and 12 have on one of their ends an exhaust gas inlet 17, and said ends are welded to the end of the exhaust pipe 7 together with one end of the upper perforated plate 14. On the other hand, the outer and the inner casings 11 and 12 have on their other ends an exhaust gas outlet 18, and said other ends of the outer and the inner casings 11 and 12 are welded to the end of the exhaust pipe 9 together with one end of the lower perforated plate 15. Furthermore, the upper and the lower perforated plates 14 and 15 are welded to the lower and the upper perforated plates 15 and 14, respectively.

According to the present invention, as seen in FIG. 2, the upper perforated plate 14 is arranged so as to incline towards the exhaust gas outlet 18 relative to the upper inner wall of the inner casing 12. As a result, a restricted opening 19 is formed between the inner casing 12 and the highest portion of the upper perforated plate 14, and an upper chamber 20 expanding towards the exhaust gas outlet 18 is formed downstream of the restricted opening 19. As is hereinafter decribed, this upper chamber 20 functions as a reactor chamber for burning the unburned HC and CO components in the exhaust gas. In addition, the upper and the lower perforated plates 14 and 15 are arranged so that the thickness of the catalytic layer 16 gradually towards the exhaust gas outlet 18. A buffer plate 22 is disposed on the upper perforated plate 14 for preventing the deterioration of a part of the catalyzer, which would otherwise be caused by the exhaust gas flowing in the exhaust pipe 7 impinging only against a certain limited portion of the upper peforated plate 14.

The exhaust gas containing the secondary air fed from the air manifold 6 is delivered into the exhaust pipe 7 via the exhaust manifold 4 and, then, the exhaust gas enters into the chamber 20 via the exhaust gas inlet 17 and the restricted opening 19. When the exhaust gas passes through the restricted opening 19, unburned CO and HC in the exhaust gas is fully mixed with the secondary air and, then, a part of the exhaust gas enters into the forward portion 16a of the catalytic converter 16. Said part of the exhaust gas is delivered into a lower chamber 21 after being completely oxidized in the catalytic layer 16. Consequently, the temperature of the forward portion 16a of the catalytic layer 16 becomes relatively higher due to the heat produced by the oxidation of the unburned HC and CO. On the other hand, the remaining exhaust gas is delivered into the rear portion of the upper chamber 20 while receiving the heat from the forward portion 16a having a relatively high temperature. Consequently, the exhaust gas in the upper chamber 20 is heated to a temperature causing the oxidation of unburned CO and HC, thus, causing oxidation of unburned HC and CO in the upper chamber 20. Then, the exhaust gas fully purified in the upper chamber 20 flows into the lower chamber 21 via the rear portion 16b , having a relatively thinner thickness, of the catalytic layer 16. As is apparent from the above description, the exhaust gas in the upper chamber 20 is almost completely purified and, thus, only an extremely small amount of unburned CO and HC remains in the exhaust gas passing through the rear portion 16b of the catalytic layer 16. Consequently, it is sufficient that the rear portion 16b of the catalytic layer 16 have only a thickness necessary to completely purify said extremely small amount of unburned CO and HC.

As is aforementioned, a part of the exhaust gas introduced into the catalytic converter 8 is oxidized in the catalytic layer 16, while the remaining exhaust gas absorbs heat produced in the catalytic layer 16 due to the oxidation of said part of the exhaust gas and is almost completely oxidized in the upper chamber 20. Consequently, even if a large amount of unburned CO and HC is introduced into the catalytic converter 8, there is no danger that the catalytic converter 8 will be overheated and melted.

Figure 3:
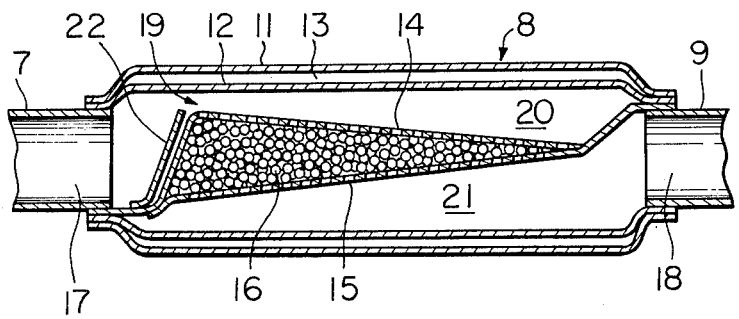
FIG. 3 is a longitudinal cross-sectional view of another embodiment.
Figure 4:
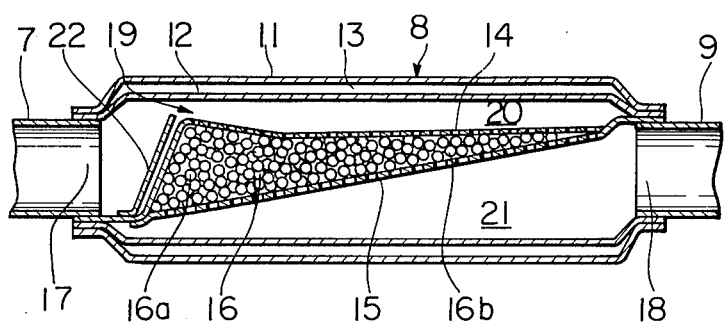
FIG. 4 is a longitudinal cross-sectional view of a further embodiment.

As is shown in FIG. 3, the lower perforated plate 15 may be arranged so as to be inclined relative to the lower inner surface of the inner casing 12 so that the lower chamber 21 expands towards the exhaust gas outlet 18. In this case, as is shown in FIG. 3, the upper perforated plate 14 may be arranged so as to be inclined relative to the upper inner surface of the inner casing 12 so that the upper chamber 20 also expands towards the exhaust gas outlet 18. However, as is shown in FIG. 4, the upper perforated plate 14 may be arranged so that the distance between the upper inner surface of the inner casing 12 and the upper surface of the upper perforated plate 14 is a uniform height over the entire area of the upper surface of fhe upper perforated plate 14 except for the foward portion of the upper perforated plate 14.

Figure 5:
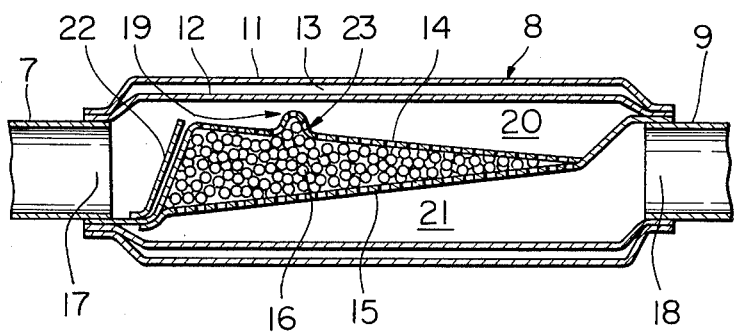

As shown in FIG. 5, the restricted opening 19 may be formed between the inner casing 12 and a raised portion 23 which is formed by protruding a part of the upper perforated plate 14. Also, as is shown in FIG. 6, the restricted opening 19 may be formed between the upper perforated plate 14 and a raised portion 24 which is formed by protruding a part of the inner casing 12.

Furthermore, as is shown in FIG. 7, the upper perforated plate 14 may be arranged so that the distance between the upper inner surface of the inner casing 12 and the upper surface of the upper perforated plate 14 is a uniform height, and the buffer plate 22 may be formed so as to project upwards beyond the upper perforated plate 14. In this case, the restricted opening 19 is formed between the upper casing 12 and the top end of the buffer plate 22.

As is hereinbefore described, according to the present invention, the thickness of the catalytic layer 16 decreases towards the exhaust gas outlet 18. However, it is possible not to reduce the distance between the upper perforated plate 14 and the lower perforated plate 15 towards the exhaust gas outlet 18. That is to say, in a catalytic converter in which the upper perforated plate 14 is arranged parallel to the lower perforated plate 15 and the catalytic layer 16 comprises an active catalyzer and an inert catalyzer, it is possible to reduce the density of the active catalyzer towards the exhaust gas outlet 18. That is, the catalytic layer may be arranged so that active catalyzer has a density gradient.

According to the present invention, instead of oxidizing all of the exhaust in the catalytic layer as in a conventional catalytic converter, a part of the exhaust gas is introduced into the catalytic layer and is oxidized therein, and the heat produced by the oxidation of said part of the exhaust gas is used for causing the autoxidation of the remaining exhaust gas in the upper chamber of the catalytic converter. Consequently, it is possible to purify a large amount of unburned HC and CO and prevent the deterioration of the catalyzer and the melting of the catalytic converter.

What is claimed is:

1. A catalytic converter for treating a mixture of exhaust gas and air for purifying the unburned HC and CO components in the exhaust gas from an internal combustion engine, comprising:
   an elongated casing defining a chamber and having on its one end an exhaust gas inlet and on its other end an exhaust gas outlet;
   a pair of spaced upper and lower perforated plates extending from said exhaust gas inlet to said exhaust gas outlet and dividing said chamber into an upper portion connected only to said exhaust gas inlet, a lower portion connected only to said exhaust gas outlet and a middle portion for holding catalyzer between said upper and said lower perforated plates, the cross-sectional area of said middle portion decreasing towards said exhaust gas outlet; and means in said upper portion for mixing the said mixture of exhaust gas and air, said means comprising a gas flow-restricting means on the upstream side of the exhaust gas for forming an unburned components burning chamber is said upper portion downstream of said restricting means.

2. The catalytic converter of claim 1, wherein said upper perforated plate comprises a flat top surface portion facing said casing, a sharply inclined portion facing said exhaust gas inlet and a corner portion interconnecting said flat top surface portion with said sharply inclined portion, said lower perforated plate comprising a flat bottom surface extending towards said exhaust gas outlet from said exhaust gas inlet, said middle portion being formed by said flat top surface portion, said sharply inclined portion and said flat bottom surface portion, the distance between said flat top surface portion and said flat bottom surface portion decreasing towards said exhaust gas outlet from said exhaust gas inlet.

3. The catalytic converter of claim 1, wherein at least a part of said flat top surface portion of the upper perforated plate is inclined relative to the casing so that the upper portion expands towards said exhaust gas outlet, said flow restricting means comprising said casing and said corner portion of the upper perforated plate, said casing and said corner forming a restricted opening through which the exhaust gas passes.

4. The catalytic converter of claim 2, including a raised portion formed on said flat top surface portion of the upper perforated plate, said exhaust gas flow restricting means being defined by said casing and said raised portion which form a restricted opening through which the exhaust gas passes.

5. The catalytic converter of claim 2, including a raised portion formed on an inner surface of said casing, said exhaust gas flow restricting means being defined by said raised portion and said flat top surface portion of the upper perforated plate, said portion and said flat top portion forming a restricted opening through which the exhaust gas passes.

6. The catalytic converter of claim 1, wherein said upper perforated plate comprises a top surface portion facing said casing, a sharply inclined portion facing said exhaust gas inlet and a corner portion interconnecting said top surface portion with said sharply inclined portion, a buffer plate for preventing the exhaust gas from directly impinging against said sharply inclined portion of the upper perforated plate and mounted on said upper perforated plate, a top end of said buffer plate projecting upwardly beyond said top surface portion of the upper perforated plate, said exhaust gas flow restricting means being defined by said casing and said top end of said buffer plate, said casing and said top end forming a restricted opening through which the exhaust gas passes.

* * * * *